United States Patent
Branham (10) Patent No.: US 7,614,755 B2
(45) Date of Patent: Nov. 10, 2009

(54) RETAINER CLIP FOR A MIRROR ASSEMBLY HOUSING BEZEL

(75) Inventor: Michael Dean Branham, Blythewood, SC (US)

(73) Assignee: Lang-Mekra North America LLC, Ridgeway, SC (US)

(*) Notice: Subject to any disclaimer, the term of this patent is extended or adjusted under 35 U.S.C. 154(b) by 397 days.

(21) Appl. No.: 11/818,464

(22) Filed: Jun. 14, 2007

(65) Prior Publication Data

US 2008/0259476 A1   Oct. 23, 2008

Related U.S. Application Data

(60) Provisional application No. 60/925,327, filed on Apr. 19, 2007.

(51) Int. Cl.
B60R 1/06   (2006.01)
(52) U.S. Cl. .................. 359/871; 248/475.1; 24/456
(58) Field of Classification Search ............... 359/838, 359/871, 883; 248/475.1; 24/289, 456, 485, 24/570, 571, 572.01, 573.09, 581.1, 581.11, 24/591.1, 592.1, 598.4, 594.1, 494.11, 602, 24/698.1, 704.1
See application file for complete search history.

(56) References Cited

U.S. PATENT DOCUMENTS

| 378,785 | A | | 2/1888 | Gilleland |
|---|---|---|---|---|
| 382,977 | A | | 5/1888 | Harmel |
| 2,527,932 | A | | 10/1950 | Iwashita |
| 2,698,470 | A | * | 1/1955 | Buedingen .................. 411/461 |
| 3,163,702 | A | | 12/1964 | Warhol |
| 4,027,413 | A | | 6/1977 | Moede |
| 4,612,609 | A | * | 9/1986 | Collins ................. 362/306 |
| 4,653,798 | A | * | 3/1987 | White et al. ............... 296/97.5 |
| 4,974,351 | A | | 12/1990 | Ghislanzoni |
| 4,991,329 | A | | 2/1991 | Wilson |
| 5,141,192 | A | * | 8/1992 | Adams .................. 248/231.81 |
| 5,199,201 | A | | 4/1993 | Vilims |
| 5,528,470 | A | | 6/1996 | White |
| 5,604,644 | A | * | 2/1997 | Lang et al. ............... 359/871 |
| 5,662,375 | A | * | 9/1997 | Adams et al. ............... 296/214 |
| 5,760,980 | A | * | 6/1998 | Lang ....................... 359/872 |
| 5,910,351 | A | | 6/1999 | Davis et al. |
| 6,195,194 | B1 | | 2/2001 | Roberts et al. |
| 7,008,089 | B1 | | 3/2006 | McCloy et al. |
| D554,568 | S | * | 11/2007 | Branham ................. D12/187 |
| 2003/0213105 | A1 | * | 11/2003 | Bednarski ................. 24/289 |
| 2006/0221265 | A1 | | 10/2006 | Chen et al. |
| 2006/0245025 | A1 | | 11/2006 | Tonar et al. |

* cited by examiner

*Primary Examiner*—Alessandro Amari
*Assistant Examiner*—Mark Consilvio
(74) *Attorney, Agent, or Firm*—McNair Law Firm, P.A.; Seann P. Lahey (57) ABSTRACT

An exterior vehicle mirror assembly comprising a housing including at least one retainer clip slot; a bezel carried on said housing; a retainer clip flange extending from said bezel generally adjacent said retainer clip slot; at least one retainer clip carried by said retainer clip flange having a slanted bearing face engaging said housing adjacent said retainer clip slots, and a securing lip disposed below said slanted bearing face that extends into said retainer clip slot to secure said bezel to said housing; wherein said slanted bearing face bears against said housing to prevent flexing of said retainer clip from disengaging said securing lip from said retainer clip slot when a force is applied to attempt removal of said bezel from said housing.

19 Claims, 6 Drawing Sheets

RETAINER CLIP FOR A MIRROR ASSEMBLY HOUSING BEZEL

CROSS REFERENCE TO RELATED APPLICATION/CLAIM OF PRIORITY

This application claims priority under 35 USC §120 from U.S. Provisional Patent Application Ser. No. 60/925,327 filed Apr. 19, 2007 having the same title.

BACKGROUND OF THE INVENTION

1) Field of the Invention

The present invention relates generally to exterior rear view mirror assemblies for motor vehicles, and more particularly, to a retainer clip for releasably securing a bezel on a housing of the mirror assembly.

2) Description of Related Art

A substantial problem with external vehicle rear view mirrors, particularly in the case of commercial vehicles, is the occurrence of vibration. First, vibration can negatively affect the use of the mirror, and second, vibration of the mirror can lead to damage due to fatigue for nearly every component in the mirror assembly. The housing components are particularly susceptible to wind and road vibrations, leading to excessive wear and tear between housing components.

It is common for a typical exterior rear view mirror assembly to have a primary housing which covers and protects various interior components, and a bezel which attaches to the rim of the housing to provide a finished appearance, and even support elements of the mirror assembly. The housing and bezel typically snap together through various forms of clips that are usually molded as part of the housing or bezel. The clips engage various recesses or openings in one or the other of the housing and bezel to secure the bezel on the housing. The problem with the arrangements currently used is that the vibrations cause the clips to wear and loosen the connection between the housing and bezel. As the clips continue to wear, they eventually disengage and the bezel can fall off or be easily pulled off of the housing. Further, many of the clip designs simply do not provide sufficient strength and connection to prevent the bezel from being easily removed. Typically the clips will pop out just as easily as they engage. Additionally, because the clips are formed into the bezel or housing, they cannot be replaced when worn out, or when broken, to re-secure the bezel. It is often the case that the entire mirror assembly must be replaced when the clips securing the bezel loosen or break.

Accordingly, it is an object of the present invention to provide an external rear view mirror assembly for vehicles, especially for commercial vehicles, which includes an improved interconnection between the housing and bezel that is less subject to wear and tear caused by vibration.

It is a further object of the present invention to provide a retainer clip for attaching the bezel to the housing which is replaceable.

It is a further object of the present invention to provide a retainer clip for attaching the bezel to the housing that requires selected disengagement of the clip to remove the bezel from the housing to prevent the bezel from popping off the housing.

SUMMARY OF THE INVENTION

The above objectives are accomplished according to the present invention by providing an exterior vehicle mirror assembly comprising a housing defined by a cover with a generally annular rim extending from the cover and a plurality of retainer clip slots spaced throughout the rim; a bezel having a generally complementary annular shape to the rim and including a rim receiving groove for receiving the rim to seat the bezel on the housing; a retainer clip flange extending from the bezel generally adjacent the rim on an interior side of the housing when the bezel is seated on the rim for securing the bezel to the housing; a plurality of retainer clips carried by the retainer clip flange; the retainer clips each including a curved base plate having a first distal end adapted for attachment to the retainer clip flange, and a second distal end adapted for releasably engaging the retainer clip slots; the second distal end of the retainer clips including a slanted bearing face for biasing against an interior side of the rim adjacent the retainer clip slots, and a securing lip disposed below the slanted bearing face that extends in a generally transverse plane from the curved base plate which is adapted for insertion into the retainer clip slots; wherein the curved base plate biases the second distal end against the rim to insert the securing lip into the retainer clip slots when the bezel is seated on the rim and wherein attempted withdrawal of the bezel from the rim directs the slanted bearing face against the interior side of the rim to resist the securing lip from sliding out of the retainer clip slot to prevent removal of the bezel from the housing.

In a further embodiment, the retainer clip flange includes a plurality of clip carrier arms with each the clip carrier arm extending across a clip retraction opening in the flange, wherein the clip carrier arms are adapted to cooperate with the first distal end of the retainer clips to mount the clips on the flange.

In a further embodiment, a retraction prong is carried on the curved base plate that extends upward from the base plate to form a channel between the retraction prong and the base plate for receiving a tool to direct the retainer clip in the opposite direction from the bias of the curved base plate to withdrawal the securing lip from the retainer clip slot so that the bezel may be removed from the housing.

In a further embodiment, the first distal end of the curved base plate includes a generally J-shaped hook portion adapted for attachment to the clip carrier arms.

In a further embodiment, the clip carrier arms include a mounting projection extending from a lower portion of the clip carrier arms, wherein the mounting projection includes a generally complementary shape to at least a portion of the J-shaped hook for cooperating with the hook to mount the retainer clips to the clip carrier arms.

In a further embodiment, the J-shaped hook includes a lower hook retaining lip adapted for extending across a portion of the mounting projection along a plane generally transverse to the curved base plate.

In a further embodiment, an upper hook retaining lip is disposed on the curved base plate above the J-shaped hook portion and adapted for extending across an upper portion of the clip carrier arms along a plane generally transverse to the curved base plate, wherein the upper and lower hook retaining lips cooperate to secure the J-shaped hook portion of the curved base plate to the clip carrier arms.

In a further embodiment, a retaining groove is disposed between the securing lip and the slanted bearing face, wherein an edge of the retainer clip slot is positioned in the retaining groove when the securing lip is inserted into the retainer clip slot to resist withdrawal of the securing lip from the retainer clip slot and prevent removal of the bezel from the housing.

Further, the above objectives are accomplished according to the present invention by providing a retainer clip for attaching a bezel to a housing for an exterior vehicle mirror assembly, the retainer clip comprising a curved base plate having a first distal end adapted for attachment to the bezel, and a second distal end adapted for releasably engaging the housing; a generally J-shaped hook portion included in the first distal end of the curved base plate for attaching to the bezel; a slanted bearing face included in the second distal end of the curved base plate for biasing against the housing; a securing lip included in the second distal end of the curved base plate disposed below the slanted bearing face that extends in a generally transverse plane from the curved base plate for engaging the housing; wherein the curved base plate biases the slanted bearing face to bear against the housing to prevent disengagement of the securing lip from the housing once the bezel is mounted on the housing.

Further, the above objectives are accomplished according to the present invention by providing an exterior vehicle mirror assembly comprising a housing including at least one retainer clip slot; a bezel carried on the housing; a retainer clip flange extending from the bezel generally adjacent the retainer clip slot; at least one retainer clip carried by the retainer clip flange having a slanted bearing face engaging the housing adjacent the retainer clip slots, and a securing lip disposed below the slanted bearing face that extends into the retainer clip slot to secure the bezel to the housing; wherein the slanted bearing face bears against the housing to prevent flexing of the retainer clip from disengaging the securing lip from the retainer clip slot when a force is applied to attempt removal of the bezel from the housing.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF A PREFERRED EMBODIMENT

Figure 1:
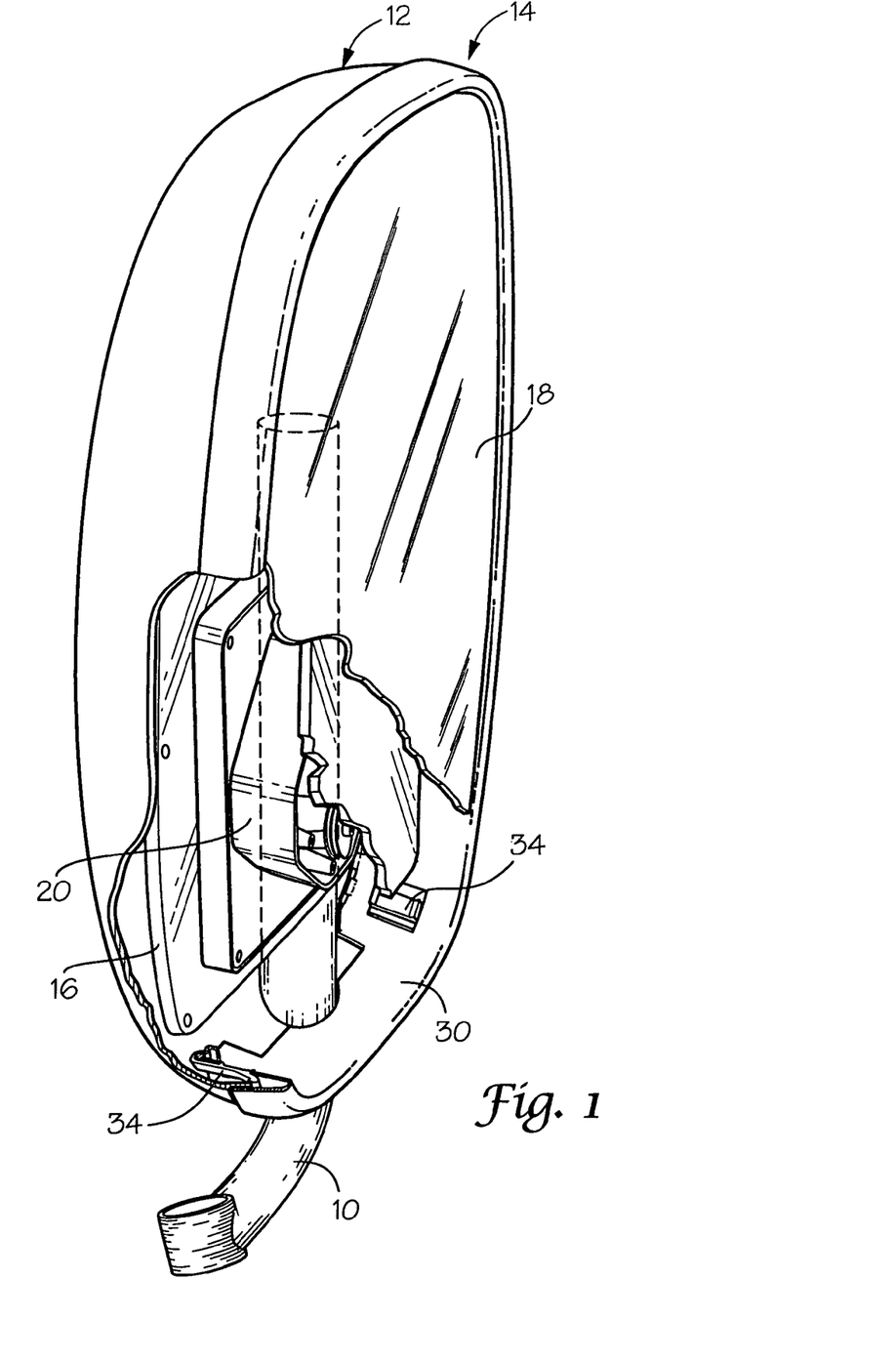
FIG. 1 shows a perspective cut-away view of the mirror assembly according to the present invention.

With reference to the drawings, the invention will now be described in more detail. A preferred embodiment of the invention, with reference to FIG. 1, shows a cut-away view of a fully assembled exterior rear view mirror assembly of the type used on large commercial trucks and buses. The exterior rear view mirror assembly encompasses a support arm 10 for fastening of the mirror onto the vehicle. A housing, designated generally as 12, is provided for protecting various mirror assembly components. A bezel, designated generally as 14, is carried on the housing to provide a clean finished appearance to the edge of housing 12. A carrier plate 16 is disposed within housing 12 and affixed to support arm 10 to support the various mirror assembly components on the support arm. Housing 12 and bezel 14 are preferably mounted directly to carrier plate 16, but may be constructed and arranged to be supported on carrier plate 16 through a variety of intermediate components, such as a support plate disposed between housing 12 and carrier plate 16. In the illustrated embodiment, housing 12 is attached to bezel 14, which in turn is affixed to carrier plate 16. Mirror glass 18 is carried on motor units 20 to provide automated mirror viewing adjustment. The mirror glass may alternatively be supported on manually adjustable means well-known to those skilled in the art, or even fixed directly to carrier plate 16. In the preferred illustrated embodiment, motor units 20 are mounted to carrier plate 16. The motor units may be directly or indirectly mounted to carrier plate 16 depending on the arrangement and application of various mirror glass sizes and other structural component requirements as is well-known to those skilled in the art.

Figure 2:
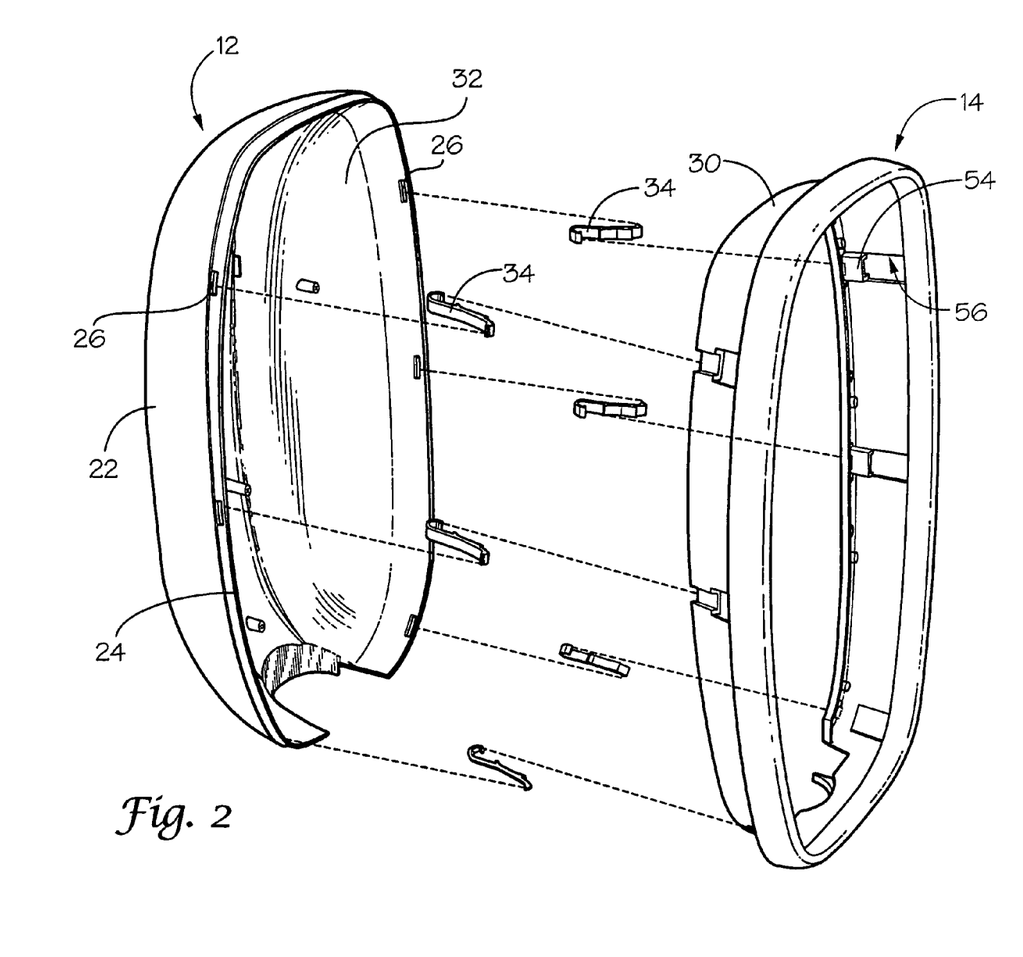
FIG. 2 shows an exploded view of the mirror assembly housing and bezel according to the present invention.

Referring to FIG. 2, housing 12 is defined by a cover 22 with a generally annular rim 24 extending outwardly from cover 22. Bezel 14 has a generally complementary annular shape to rim 24 for surrounding the rim. Bezel 14 also includes a rim receiving groove, designated generally as 28, (best shown in FIGS. 5a-5c) for receiving rim 24 to seat bezel 14 on housing cover 22.

Figure 3:
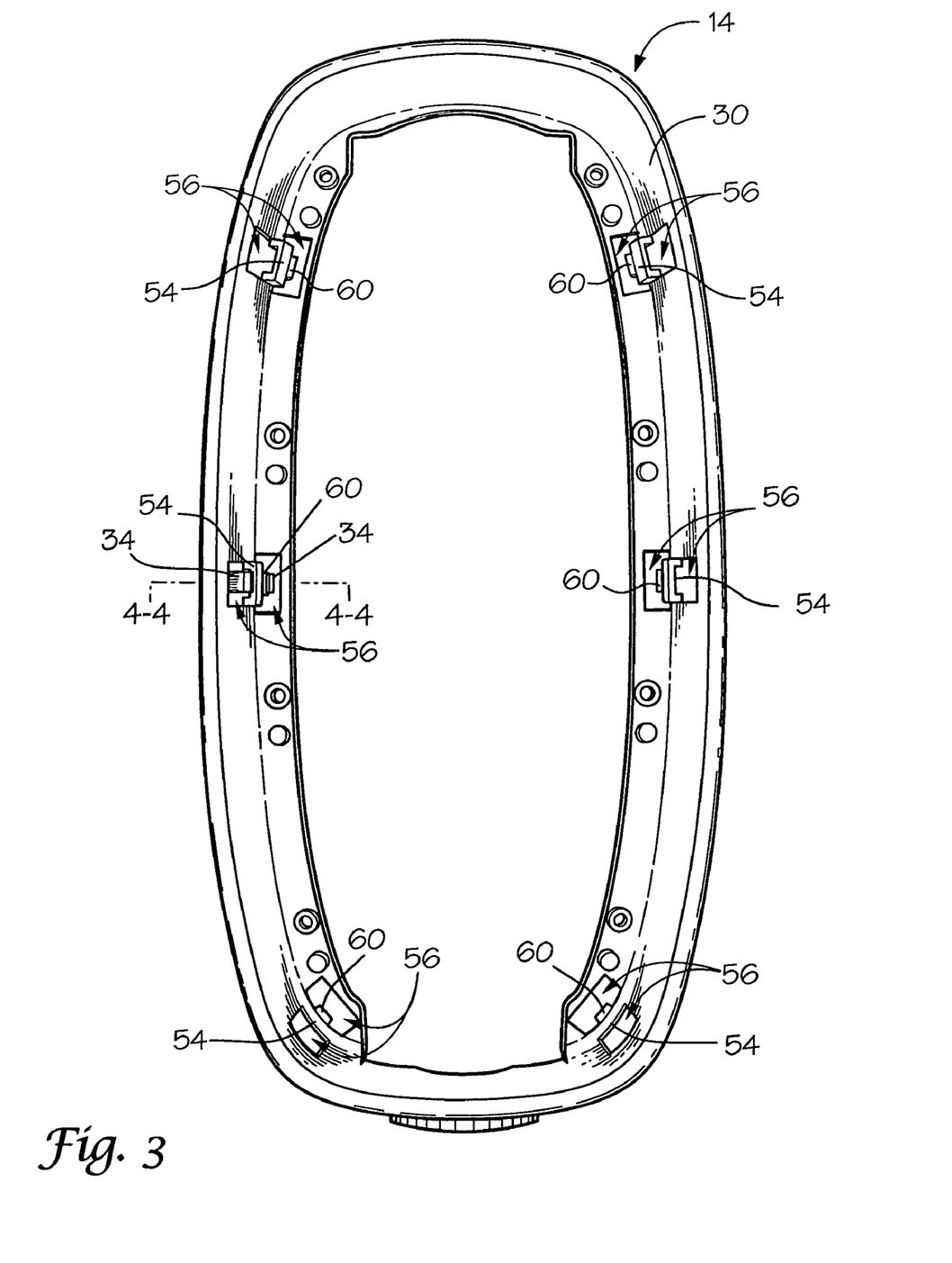
FIG. 3 shows a front elevation view of the bezel according to the present invention.

Referring to FIGS. 2 and 3, a retainer clip flange 30 extends from bezel 14 for being received in housing 12. With further reference to FIG. 5b, flange 30 extends generally adjacent rim 24 on an interior side 32 of housing 12 when bezel 14 is seated on rim 24 for securing bezel 14 to housing 12.

Figures 4A, 4B:
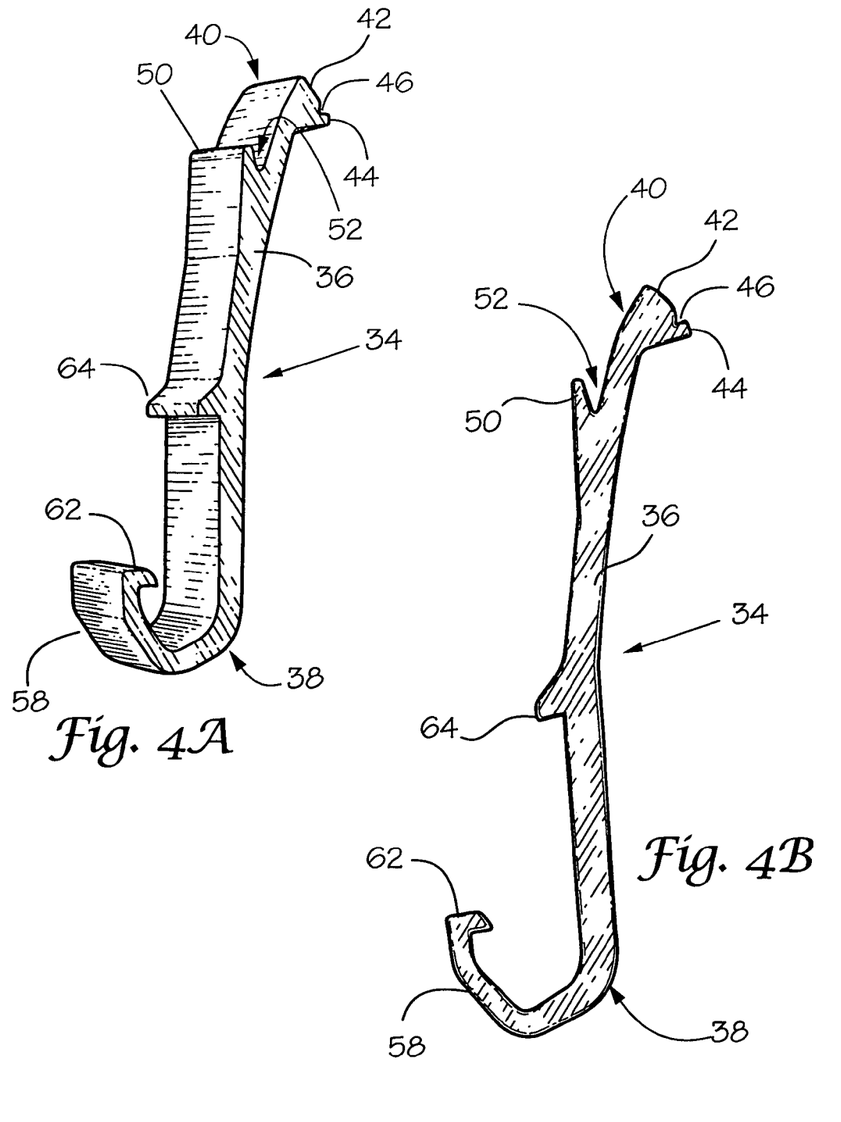
FIG. 4A shows a perspective view of the retainer clip according to the present invention.
FIG. 4B shows a side elevation view of the retainer clip according to the present invention.

Referring to FIG. 1, a plurality of retainer clip slots 26 are spaced throughout rim 24 for receiving a plurality of retainer clips, designated generally as 34, which are carried by retainer clip flange 30. With further reference to FIGS. 4a and 4b, each of retainer clips 34 includes a curved base plate 36 having a first distal end, designated generally as 38, adapted for attachment to retainer clip flange 30, and a second distal end, designated generally as 40, adapted for releasably engaging retainer clip slots 26. Second distal end 40 of retainer clips 34 includes a slanted bearing face 42. A securing lip 44 is disposed below slanted bearing face 42 and extends in a generally transverse plane from curved base plate 36.

Figure 5A:
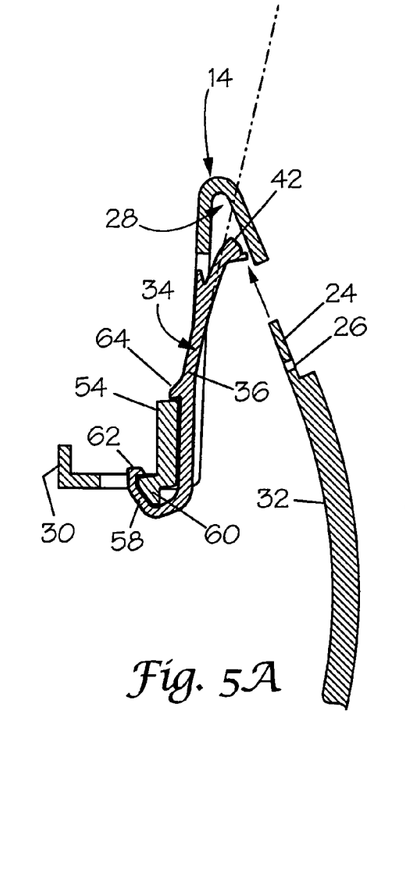
FIG. 5A shows a cross-section view of the retainer clip carried on the retainer clip flange of the bezel prior to engagement with the housing according to the present invention.
Figure 5B:
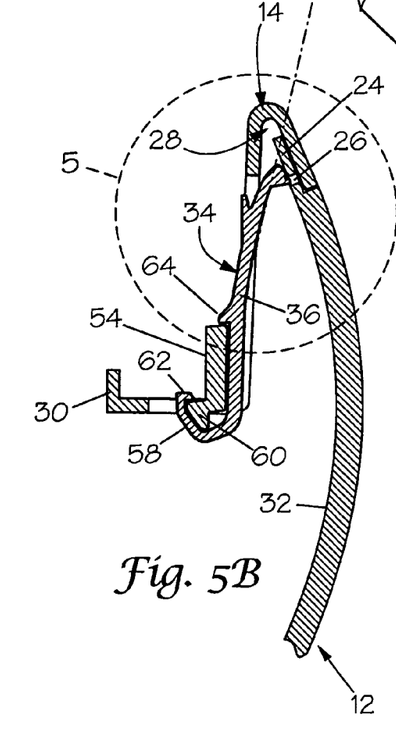
FIG. 5B shows a cross-section view of the retainer clip engaging the retainer clip slot of the housing according to the present invention.
Figure 5C:
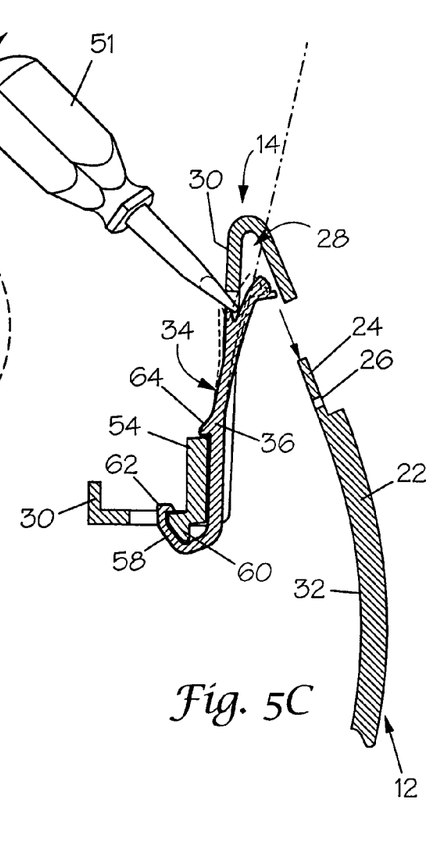
FIG. 5C shows a cross-section view of the retainer clip disengaging from the retainer clip slot of the housing according to the present invention; and, FIG. 6 shows a detailed cross-section view of the retainer clip engaging the retainer clip slot of the housing in the indicated portion of FIG. 5B according to the present invention.
Figure 6:
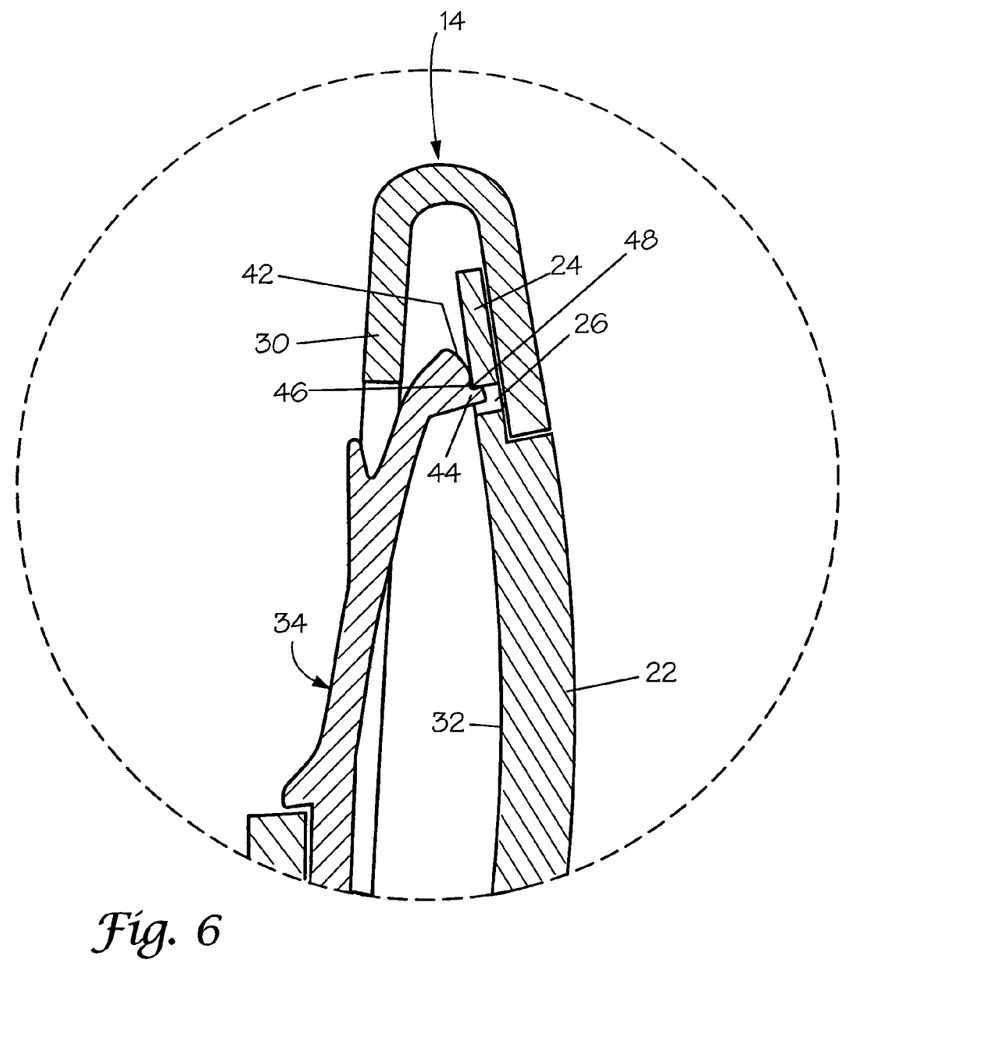

Referring to FIGS. 5a-5c, as bezel 14 is seated on rim 24, slanted bearing face 42 biases against interior side 32 of rim 24 adjacent retainer clip slots 26. Securing lip 44 extends into retainer clip slot 26 to secure bezel 14 to housing 12. Curved base plate 36 maintains a bias of second distal end 40 against rim 24 to insert securing lip 44 into retainer clip slots 26 when bezel 14 is seated on rim 26. Further referring now to FIG. 6, in the illustrated construction and arrangement, attempted withdrawal of bezel 14 from rim 24 directs slanted bearing face 42 against interior side 32 of rim 24 to resist securing lip 44 from sliding out of retainer clip slot 26 to prevent removal of bezel 14 from housing 12.

In a further embodiment, a retaining groove 46 is disposed between securing lip 44 and slanted bearing face 42, wherein an edge 48 of retainer clip slot 26 is positioned in retaining groove 46 when securing lip 44 is inserted into retainer clip slot 26 to resist withdrawal of securing lip 44 from retainer clip slot 26 and prevent removal of bezel 14 from housing 12. In combination with slanted bearing face 42, retaining groove 46 helps to resist securing lip 44 for sliding out of retainer clip slot 26 when force is applied during attempted removal of bezel 14. Further, as wear and tear occurs between retainer clip 34 and housing 12, retainer clip 34 only biases further against housing 12 to ensure the continued engagement of securing lip 44 in retainer clip slot 26.

Referring to FIGS. 4a and 4b, in a further embodiment, a retraction prong 50 is carried on curved base plate 36 that extends upward from the base plate to form a channel, designated generally as 52, between retraction prong 50 and base plate 36. As shown in FIG. 5c, a tool 51 may be placed in channel 52 to direct retainer clip 34 in the opposite direction from the bias of curved base plate 36 to withdraw securing lip 44 from retainer clip slot 26 so that bezel 14 may be removed from housing 12. Because slanted bearing face 42 and retaining groove 46 are directed against rim 24 when attempting to dislodge bezel 14 from housing 12, securing lip 44 is prevented from disengaging retainer clip slot 26. Only by first retracting retainer clip 34 as shown in FIG. 5c can bezel 14 be removed without damaging housing 12, bezel 14, or retainer clip 34.

Referring to FIGS. 2 and 3, in a preferred embodiment, retainer clip flange 30 includes a plurality of clip carrier arms 54 with each of the clip carrier arms extending across a clip retraction opening, designated generally as 56, in retainer clip flange 30. Further referring to FIGS. 5a-5c, clip carrier arms 54 are adapted to cooperate with first distal end 38 of retainer clips 34 to mount retainer clips 34 on flange 30. In a preferred embodiment, first distal end 38 curved base plate 36 includes a generally J-shaped hook portion 58 adapted for attachment to clip carrier arms 54. Clip carrier arms 54 include a mounting projection 60 extending from a lower portion of clip carrier arms 54. Mounting projection 60 includes a generally complementary shape to at least a portion of J-shaped hook 58 for cooperating with hook 58 to mount retainer clips 34 to clip carrier arms 54.

In a further embodiment, J-shaped hook portion 58 includes a lower hook retaining lip 62 adapted for extending across a portion of mounting projection 60 along a plane generally transverse to curved base plate 36. Additionally, an upper hook retaining lip 64 is disposed on curved base plate 36 above J-shaped hook portion 58 and adapted for extending across an upper portion of clip carrier arms 54 along a plane generally transverse to curved base plate 36. In operation as shown in FIGS. 5a-5c, upper and lower hook retaining lips 62 and 64, respectively, cooperate to secure J-shaped hook portion 58 to clip carrier arms 54.

While a preferred embodiment of the invention has been described using specific terms, such description is for illustrative purposes only, and it is to be understood that changes and variations may be made without departing from the spirit or scope of the following claims.

What is claimed is:

1. An exterior vehicle mirror assembly comprising:
  a housing defined by a cover with a generally annular rim extending from said cover and a plurality of retainer clip slots spaced throughout said rim;
  a bezel having a generally complementary annular shape to said rim and including a rim receiving groove for receiving said rim to seat said bezel on said housing;
  a retainer clip flange extending from said bezel generally adjacent said rim on an interior side of said housing when said bezel is seated on said rim for securing said bezel to said housing;
  a plurality of retainer clips carried by said retainer clip flange;
  said retainer clips each including a curved base plate having a first distal end adapted for attachment to said retainer clip flange, and a second distal end adapted for releasably engaging said retainer clip slots;
  said second distal end of said retainer clips including a slanted bearing face for biasing against an interior side of said rim adjacent said retainer clip slots, and a securing lip disposed below said slanted bearing face that extends in a generally transverse plane from said curved base plate which is adapted for insertion into said retainer clip slots;
  wherein said curved base plate biases said second distal end against said rim to insert said securing lip into said retainer clip slots when said bezel is seated on said rim and wherein attempted withdrawal of said bezel from said rim directs said slanted bearing face against said interior side of said rim to resist said securing lip from sliding out of said retainer clip slot to prevent removal of said bezel from said housing.

2. The mirror assembly of claim 1 wherein said retainer clip flange includes a plurality of clip carrier arms with each said clip carrier arm extending across a clip retraction opening in said flange, wherein said clip carrier arms are adapted to cooperate with said first distal end of said retainer clips to mount said clips on said flange.

3. The mirror assembly of claim 2 including a retraction prong carried on said curved base plate that extends upward from said base plate to form a channel between said retraction prong and said base plate for receiving a tool to direct said retainer clip in the opposite direction from the bias of said curved base plate to withdrawal said securing lip from said retainer clip slot so that said bezel may be removed from said housing.

4. The mirror assembly of claim 3 wherein said first distal end of said curved base plate includes a generally J-shaped hook portion adapted for attachment to said clip carrier arms.

5. The mirror assembly of claim 4 wherein said clip carrier arms include a mounting projection extending from a lower portion of said clip carrier arms, wherein said mounting projection includes a generally complementary shape to at least a portion of said J-shaped hook for cooperating with said hook to mount said retainer clips to said clip carrier arms.

6. The mirror assembly of claim 5 including a lower hook retaining lip adapted for extending across a portion of said mounting projection along a plane generally transverse to said curved base plate.

7. The mirror assembly of claim 6 including an upper hook retaining lip disposed on said curved base plate above said J-shaped hook portion and adapted for extending across an upper portion of said clip carrier arms along a plane generally transverse to said curved base plate, wherein said upper and lower hook retaining lips cooperate to secure said J-shaped hook portion of said curved base plate to said clip carrier arms.

8. The mirror assembly of claim 7 including a retaining groove disposed between said securing lip and said slanted bearing face, wherein an edge of said retainer clip slot is positioned in said retaining groove when said securing lip is inserted into said retainer clip slot to resist withdrawal of said securing lip from said retainer clip slot and prevent removal of said bezel from said housing.

9. A retainer clip for attaching a bezel to a housing for an exterior vehicle mirror assembly, said retainer clip comprising:
- a curved base plate having a first distal end adapted for attachment to the bezel, and a second distal end adapted for releasably engaging the housing;
- a generally J-shaped hook portion included in said first distal end of said curved base plate for attaching to the bezel;
- a slanted bearing face included in said second distal end of said curved base plate for biasing against the housing;
- a securing lip included in said second distal end of said curved base plate disposed below said slanted bearing face that extends in a generally transverse plane from said curved base plate for engaging the housing; and
- a retraction prong carried on said curved base plate that extends upward from said base plate to form a channel between said retraction prong and said base plate for receiving a tool to direct said retainer clip in the opposite direction from the bias of said curved base plate to withdrawal said securing lip from the housing;
- wherein said curved base plate biases said slanted bearing face to bear against the housing to prevent disengagement of said securing lip from the housing once the bezel is mounted on the housing.

10. The retainer clip of claim 9 including a lower hook retaining lip carried by said J-shaped hook portion of said curved base plate that extends along a plane generally transverse to said curved base plate.

11. The retainer clip of claim 10 including an upper hook retaining lip disposed on said curved base plate above said J-shaped hook portion that extends along a plane generally transverse to said curved base plate, wherein said upper and lower hook retaining lips cooperate to secure said J-shaped hook portion of said curved base plate to the bezel.

12. The retainer clip of claim 9 including a retaining groove disposed between said securing lip and said slanted bearing face for receiving a portion of the housing to resist disengagement of said securing lip from the housing.

13. An exterior vehicle mirror assembly comprising:
- a housing including at least one retainer clip slot;
- a bezel carried on said housing;
- a retainer clip flange extending from said bezel generally adjacent said retainer clip slot;
- at least one retainer clip carried by said retainer clip flange having a slanted bearing face engaging said housing adjacent said retainer clip slots, and a securing lip disposed below said slanted bearing face that extends into said retainer clip slot to secure said bezel to said housing;
- wherein said slanted bearing face bears against said housing to prevent flexing of said retainer clip from disengaging said securing lip from said retainer clip slot when a force is applied to attempt removal of said bezel from said housing.

14. The mirror assembly of claim 13 wherein said retainer clip includes a curved base plate having a first distal end adapted for engaging said retainer clip flange, and a second distal end carrying said slanted bearing face and securing lip, wherein said curved base plate biases said second distal end against said housing to insert said securing lip into said retainer clip slots and biases said slanted bearing face against said housing.

15. The mirror assembly of claim 13 including a retraction prong carried on said retainer clip that extends upward from a base plate of said clip to form a channel between said retraction prong and said base plate for receiving a tool to disengage said securing lip from said retainer clip slot.

16. The mirror assembly of claim 13 wherein said retainer clip flange includes at least one carrier arm extending across a clip retraction opening in said flange, wherein said clip carrier arm cooperates with said retainer clip to mount said clip on said flange.

17. The mirror assembly of claim 13 wherein said retainer clip includes a generally J-shaped hook portion attaching said clip to said retainer clip flange.

18. The mirror assembly of claim 17 wherein said J-shaped hook portion including a lower hook retaining lip extending transversely in relation to a base plate of said retainer clip, and an upper hook retaining lip disposed on said base plate above said lower hook retaining lip that extends transversely from said base plate, wherein said upper and lower hook retaining lips cooperate to secure said J-shaped hook portion to said retainer clip flange.

19. The mirror assembly of claim 13 including a retaining groove disposed between said securing lip and said slanted bearing face receiving an edge of said retainer clip slot to resist disengagement of said securing lip from said retainer clip slot and prevent removal of said bezel from said housing.

* * * * *